(12) United States Patent
Kim et al.

(10) Patent No.: US 10,297,801 B2
(45) Date of Patent: May 21, 2019

(54) BATTERY PACK AND MANUFACTURING METHOD THEREFOR

(71) Applicant: LG CHEM, LTD., Seoul (KR)

(72) Inventors: Ki-Youn Kim, Daejeon (KR);
Duck-Hee Moon, Daejeon (KR);
Jun-Yeob Seong, Daejeon (KR);
Sung-Chun Yu, Daejeon (KR);
Gang-U Lee, Daejeon (KR);
Jung-Hang Lee, Daejeon (KR);
Sang-Yoon Jeong, Daejeon (KR);
Yong-Joon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 63 days.

(21) Appl. No.: 15/554,809

(22) PCT Filed: Apr. 28, 2016

(86) PCT No.: PCT/KR2016/004481
§ 371 (c)(1),
(2) Date: Aug. 31, 2017

(87) PCT Pub. No.: WO2016/175590
PCT Pub. Date: Nov. 3, 2016

(65) Prior Publication Data
US 2018/0040863 A1 Feb. 8, 2018

(30) Foreign Application Priority Data

Apr. 30, 2015 (KR) .......................... 10-2015-0061977

(51) Int. Cl.
*H01M 2/10* (2006.01)
*H01M 2/02* (2006.01)
*H01M 10/04* (2006.01)

(52) U.S. Cl.
CPC ............ *H01M 2/1016* (2013.01); *H01M 2/02* (2013.01); *H01M 2/10* (2013.01); *H01M 10/045* (2013.01)

(58) Field of Classification Search
CPC .. H01M 2/1077; H01M 2/206; H01M 2/1016; H01M 2/02; H01M 10/0525; H01M 2/0207; H01M 2/0217
See application file for complete search history.

(56) References Cited

U.S. PATENT DOCUMENTS

2006/0177733 A1   8/2006  Ha et al.
2006/0214631 A1*  9/2006  Yoon .................. H01M 2/1061
                                                 320/112

(Continued)

FOREIGN PATENT DOCUMENTS

JP        2010-146879 A     7/2010
KR   10-2012-0112584 A   10/2012

(Continued)

OTHER PUBLICATIONS

International Search Report for PCT/KR2016/004481 dated Sep. 28, 2016.

*Primary Examiner* — Olatunji A Godo
(74) *Attorney, Agent, or Firm* — Birch, Stewart, Kolasch & Birch, LLP (57) ABSTRACT

The present disclosure relates to a battery pack having improved assemblability, processability, and productivity, and configured to reduce manufacturing costs and enhance the scalability and durability of a pack case. The battery pack includes: a cell assembly including a plurality of secondary cells and a plurality of cartridges, the cartridges being configured to be stacked on one another and to accommodate the secondary cells while surrounding outer circumferential portions of the secondary cells from outsides of the secondary cells; a lower housing having an empty inner (Continued)

space to accommodate the cell assembly in the inner space, the lower housing being opened on an upper side thereof; a lower end plate including a plate-shaped metallic material and placed in surface contact with a lower surface of the lower housing; and a lower cover placed on a lower portion of the lower end plate to cover the lower end plate, the lower cover being fixedly coupled to the lower housing.

18 Claims, 7 Drawing Sheets

(56) References Cited

U.S. PATENT DOCUMENTS

| | | |
|---|---|---|
| 2012/0214023 A1 | 8/2012 | Koh |
| 2012/0301765 A1 | 11/2012 | Loo et al. |
| 2013/0309542 A1* | 11/2013 | Merriman ............... B23P 15/26 |
| | | 429/120 |
| 2014/0087236 A1 | 3/2014 | Murayama et al. |
| 2015/0072206 A1 | 3/2015 | Houchin-Miller et al. |

FOREIGN PATENT DOCUMENTS

| | | |
|---|---|---|
| KR | 10-1274903 B1 | 6/2013 |
| KR | 10-2014-0130357 A | 11/2014 |
| KR | 10-2015-0044599 A | 4/2015 |
| KR | 10-2016-0144764 A | 12/2016 |

* cited by examiner

BATTERY PACK AND MANUFACTURING METHOD THEREFOR

TECHNICAL FIELD

The present application claims priority to Korean Patent Application No. 10-2015-0061977 filed on Apr. 30, 2015 in the Republic of Korea, the disclosure of which is incorporated herein by reference.

The present disclosure relates to a battery including at least one secondary cell, and more particularly, to a battery pack having improved energy density, assemblability, and durability, an automobile including the battery pack, and a method of manufacturing the battery pack.

BACKGROUND ART

Examples of currently commercialized secondary cells include nickel-cadmium cells, nickel-metal hydride cells, nickel-zinc cells, and lithium secondary cells. Among such various secondary cells, lithium secondary cells are freely rechargeable because of having substantially no memory effect compared with nickel-based secondary cells, and have a very low self-discharge rate and high energy density. Owing to these merits, there has been high interest in lithium secondary cells.

In general, lithium secondary cells use a lithium-based oxide as a positive electrode active material and a carbonaceous material as a negative electrode active material. A lithium secondary cell may include: an electrode assembly in which a positive electrode plate coated with such a positive electrode active material and a negative electrode plate coated with such a negative electrode active material are disposed with a separator therebetween; and a case, that is, a cell case in which the electrode assembly and an electrolytic solution are sealed.

In general, according to case types, lithium secondary cells may be classified into a can type in which an electrode assembly is accommodated in a metal can, and a pouch type in which an electrode assembly is accommodated in a pouch formed of an aluminum laminate sheet.

In recent years, secondary cells have been widely used not only in small-sized devices such as portable electronic devices, but also in medium to large-sized devices such as automobiles or power storage devices. For use in such medium to large-sized devices, a large number of secondary cells may be electrically connected to increase capacity and output power. In particular, pouch-type secondary cells are widely used in medium to large-sized devices owing to merits such as lightness and ease of stacking.

In the related art, when a battery pack is constructed by stacking a plurality of pouch-type secondary cells to form a cell assembly and accommodating the cell assembly in a pack case, end plates may be provided on both the outermost sides of the cell assembly in the stacking direction of the pouch-type secondary cells. In general, such end plates are formed of a metallic material and have a function of protecting and fixing secondary cells and cartridges and maintaining surface pressure.

However, in such a battery pack structure of the related art, it is necessary to fix a cell assembly and a pack case to each other in addition to fixing end plates to the cell assembly. Typically, the cell assembly may be fixed by using fastening members such as bolts and nuts between the pack case and the end plates of the cell assembly. In this case, additional spaces are necessary in the pack case and the end plates for such fastening members. In addition, it may be necessary to form or prepare an additional space in the pack case for a process of fastening the cell assembly to the pack case. However, since these spaces are not used to accommodate secondary cells, the energy density of the battery pack may be decreased, and the structure of the battery pack may be complicated.

In addition, the structure in which the end plates and the pack case are fixed using fastening members may not be effective in stably maintaining a fixed state of the cell assembly in the pack case because the fastening members may become loose as the battery pack is exposed to vibrations or impacts during use. This may cause breakage or damage of various components included in the battery pack, and thus the battery pack may malfunction or break down.

Furthermore, the battery pack structure of the related art makes it difficult to assemble the end plates and the pack case and requires the use of additional fastening members for coupling the end plates and the pack case, and a process of previously placing such fastening members on the pack case is not easy to perform, thereby decreasing productivity and increasing manufacturing costs.

Furthermore, in general, pack cases of battery packs accommodating cell assemblies are formed of a plastic material, and are thus vulnerable to impacts or the like because of low rigidity.

DISCLOSURE

Technical Problem

The present disclosure is designed to solve the problems of the related art, and therefore the present disclosure is directed to providing a battery pack having improved assemblability, processability, and productivity, and configured to reduce manufacturing costs and enhance the sealability and durability of a pack case, and providing a method of manufacturing the battery pack and an automobile including the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

To achieve the objectives, the present disclosure provides a battery pack including: a cell assembly including a plurality of secondary cells and a plurality of cartridges, the cartridges being configured to be stacked on one another and to accommodate the secondary cells while surrounding outer circumferential portions of the secondary cells from outsides of the secondary cells; a lower housing having an empty inner space to accommodate the cell assembly in the inner space, the lower housing being opened on an upper side thereof a lower end plate including a plate-shaped metallic material and placed in surface contact with a lower surface of the lower housing; and a lower cover placed on a lower portion of the lower end plate to cover the lower end plate, the lower cover being fixedly coupled to the lower housing.

Here, the lower cover may be fixedly coupled to the lower housing by a laser welding method.

Furthermore, the lower cover and the lower housing may include the same plastic material.

Furthermore, the lower cover may be fixedly coupled to the lower housing along and outside an edge of the lower end plate.

Furthermore, at least one opening may be formed in a center portion of the lower end plate, and the lower cover may be fixedly coupled to the lower housing through the opening.

Furthermore, the lower housing and the lower cover may include concave and convex portions corresponding to each other.

Furthermore, the lower end plate may include at least one bolt protruding upward, and at least one through-hole may be formed in the lower housing to pass the bolt through the through-hole.

Furthermore, at least one insertion hole may be formed in the cell assembly, and the bolt may be inserted in the insertion hole.

Furthermore, the secondary cells and the cartridges of the cell assembly may be vertically stacked, and a lowermost cartridge of the cell assembly may be placed in the inner space of the lower housing in contact with a bottom surface of the lower housing.

Furthermore, the battery pack may further include an upper end plate including a plate-shaped metallic material and provided on an upper portion of the cell assembly to cover the upper portion of the cell assembly.

Furthermore, the battery pack may further include an upper housing coupled to the opened upper side of the lower housing to seal the opened upper side.

Furthermore, in addition, to achieve the objectives, the present disclosure provides an automobile including the battery pack.

In addition, to achieve the objectives, the present disclosure provides a method of manufacturing a battery pack, the method including: placing a lower end plate including a plate-shaped metallic material on a lower portion of a lower housing including an empty inner space and an opened upper side such that the lower end plate makes surface contact with the lower portion of the lower housing; placing a lower cover on a lower portion of the lower end plate to cover the lower end plate; fixedly coupling the lower cover and the lower housing to each other; and stacking secondary cells and cartridges in the inner space of the lower housing, the cartridges accommodating the secondary cells while surrounding outer circumferential portions of the secondary cells from outsides of the secondary cells.

Here, in the fixedly coupling of the lower cover and the lower housing to each other, the lower cover and the lower housing may be fixedly coupled to each other by a laser welding method.

Furthermore, the lower end plate may include at least one bolt protruding upward, and the lower housing may include at least one through-hole, and in the placing of the lower end plate, the bolt of the lower end plate may be passed through the through-hole of the lower housing.

Furthermore, at least one insertion hole may be formed in each of the cartridges, and in the stacking of the secondary cells and the cartridges, the bolt of the lower end plate may be inserted into the insertion holes of the cartridges.

Advantageous Effects

According to an aspect of the present disclosure, the lower end plate and the pack case do not require an additional structure for coupling the lower end plate to the pack case for protecting the cell assembly and ensuring the rigidity of the cell assembly.

Therefore, according to this aspect of the present disclosure, the assemblability and processability of the battery pack may be improved, and since the number of components of the battery pack is reduced, the manufacturing costs and time of the battery pack may be decreased. In addition, according to this aspect of the present disclosure, spaces such as a space for a coupling structure between the lower end plate and the pack case and a work space for the coupling structure are not required in the pack case. Therefore, the spatial efficiency of the battery pack may be increased, and unnecessary spaces may be removed from the inside of the battery pack, thereby improving the energy density of the battery pack and reducing the size of the battery pack.

In addition, according to an aspect of the present disclosure, the coupling between the lower end plate and the pack case may not be released or loosened, and thus the cell assembly may be stably fixed inside the pack case. Therefore, breakage or malfunction of the battery pack may not be caused due to relative movement of the cell assembly.

According to an aspect of the present disclosure, since the lower end plate is provided in the pack case, particularly between the lower housing and the lower cover, the rigidity of the pack case may be improved. Therefore, according to this aspect of the present disclosure, even when the pack case is impacted, the pack case, particularly the lower housing, may not be broken, and thus components of the battery pack placed inside the lower housing, such as the cell assembly or other electric components, may be safely protected.

In addition, according to an aspect of the present disclosure, the sealability of the pack case may be improved owing to the lower end plate placed in the pack case. For example, even if the lower cover is somewhat damaged by an impact applied to the pack case, permeation of foreign substances such as moisture, nail-shaped parts, or stones into the lower housing may be prevented owing to the lower end plate. In particular, when the battery pack is used in an electric vehicle, the possibility of permeation of foreign substances may be high. However, according to this aspect of the present disclosure, the durability of the battery pack may be guaranteed.

DESCRIPTION OF DRAWINGS

The accompanying drawings illustrate preferred embodiments of the present disclosure and together with the foregoing disclosure, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
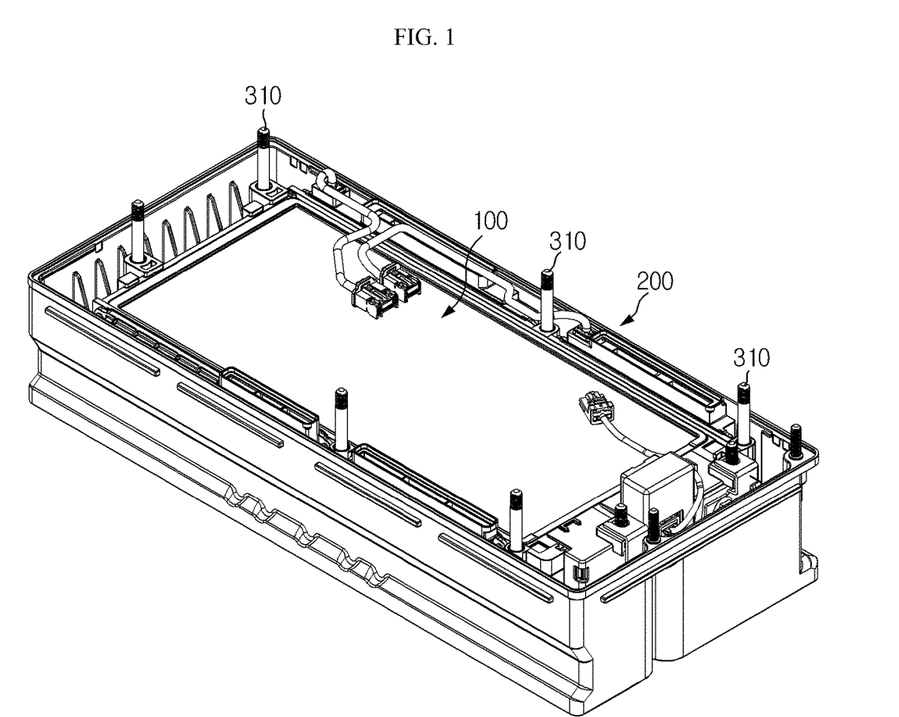
FIG. 1 is a perspective view schematically illustrating an assembled state of a battery pack according to an embodiment of the present disclosure.

FIG. 1 is a perspective view schematically illustrating an assembled state of a battery pack according to an embodiment of the present disclosure. In addition, FIG. 2 is an exploded perspective view illustrating the battery pack of FIG. 1.

Figure 2:
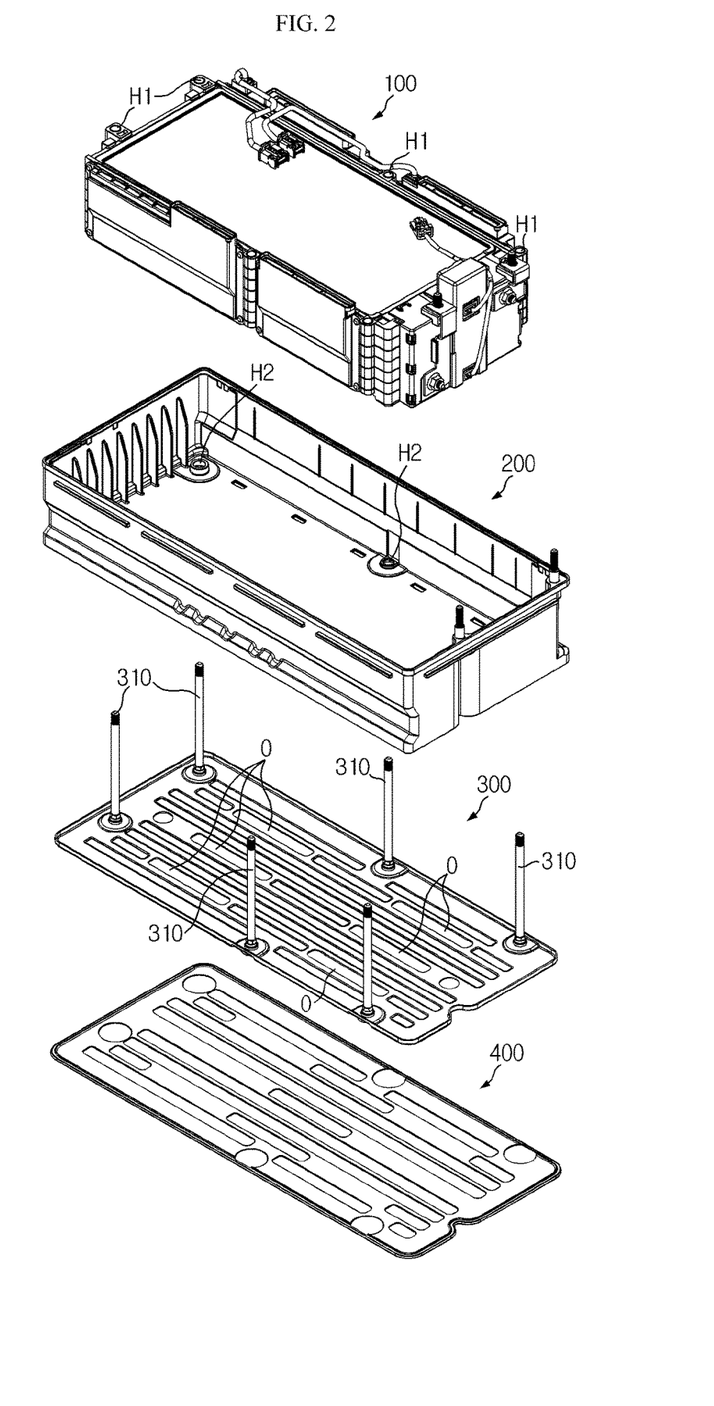
FIG. 2 is an exploded perspective view illustrating the battery pack of FIG. 1.

Referring to FIGS. 1 and 2, the battery pack of the present disclosure includes a cell assembly 100, a lower housing 200, a lower end plate 300, and a lower cover 400.

The cell assembly 100 may include a plurality of secondary cells and a plurality of cartridges.

Here, the secondary cells are components for storing or discharging electrical energy through charging and discharging operation steps. In particular, the secondary cells may be pouch-type secondary cells. Each of the secondary cells may include an electrode assembly, an electrolyte, and a pouch-type case. In addition, the secondary cells of the present disclosure may be lithium secondary cells.

The electrode assembly may be formed by arranging at least one positive electrode plate and at least one negative electrode plate with a separator therebetween. More specifically, examples of the electrode assembly includes a wound-type electrode assembly in which one positive electrode plate and one negative electrode plate are wound together with a separator, and a stacked-type electrode assembly in which a plurality of positive electrode plates and a plurality of negative electrode plates are alternately stacked with separators therebetween.

In addition, the pouch-type case may include an external insulating layer, a metal layer, and an internal adhesive layer. The pouch-type case may include a thin metal film such as a thin aluminum film for protecting internal components such as the electrode assembly and the electrolyte, complementing the electrochemical properties of the electrode assembly and the electrolyte, and guaranteeing heat dissipation. In addition, the thin aluminum film may be placed between insulating layers formed of an insulating material, that is, between the external insulating layer and the internal adhesive layer, so as to electrically insulate internal components of the secondary cell such as the electrode assembly and the electrolyte from other components located outside the secondary cell.

In particular, the pouch-type case may include two pouches, and a concave inner space may be formed in at least one of the two pouches. The electrode assembly may be accommodated in the inner space of the pouch. In addition, sealing portions may be provided on peripheral surfaces of the two pouches, and these sealing portions may be fused to each other to seal the inner space in which the electrode assembly is accommodated.

In addition, the electrode plates of the electrode assembly may be provided with electrode tabs, respectively, and at least one of the electrode tabs may be connected to an electrode lead. In addition, the electrode lead may be disposed between the sealing portions of the two pouches and exposed to the outside of the pouch-type case, and thus the electrode lead may function as an electrode terminal of the secondary cell.

According to an aspect of the present disclosure, the cell assembly 100 may include various pouch-type secondary cells known at the time of filing the present application.

The plurality of secondary cells may be included in the battery pack. In particular, the plurality of secondary cells may be vertically arranged in a lying position such that relatively large surfaces of the secondary cells may face upward and downward.

The cartridges may accommodate the secondary cells in inner spaces thereof. In particular, the cartridges may be configured to surround outer circumferential portions of the secondary cells from the outsides of the secondary cells.

Figure 3:
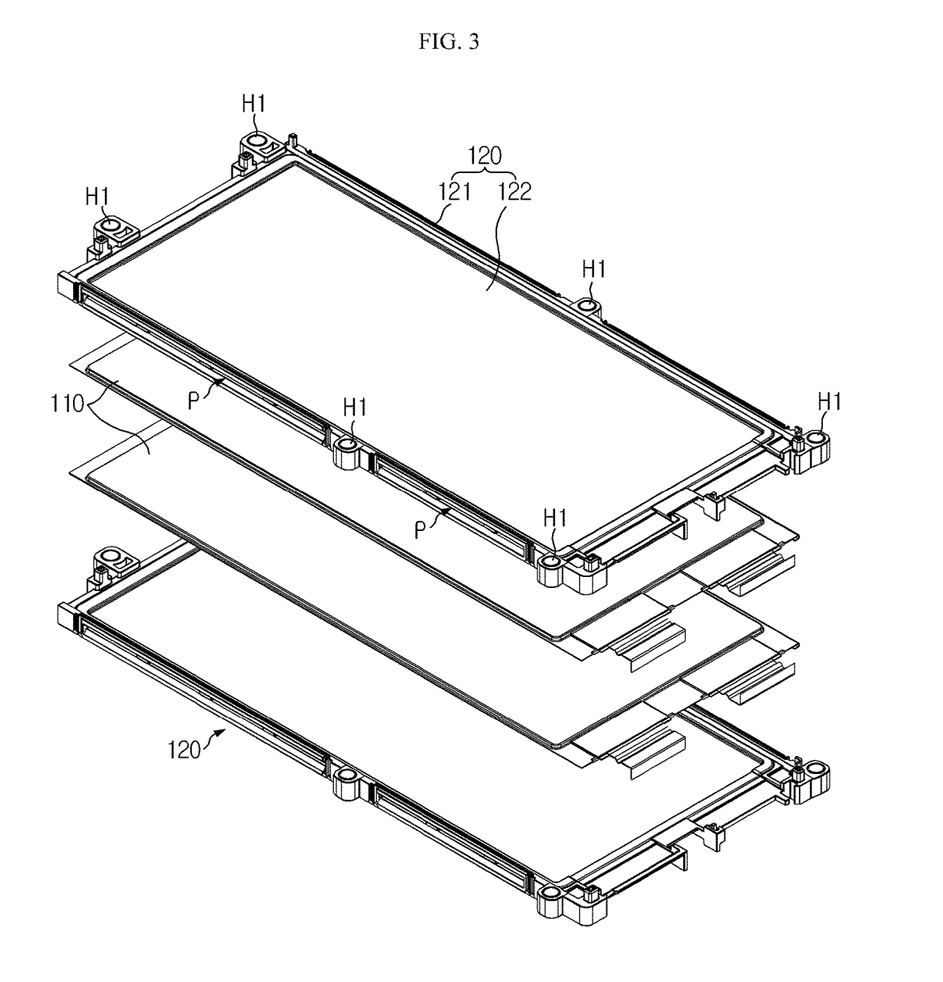
FIG. 3 is a perspective view schematically illustrating a configuration of cartridges and secondary cells according to an embodiment of the present disclosure.

FIG. 3 is a perspective view schematically illustrating a configuration of cartridges 120 and secondary cells 110 according to an embodiment of the present disclosure.

Referring to FIG. 3, each of the cartridges 120 may include a main frame 121 having a substantially tetragonal ring shape. In this case, the main frame 121 of the cartridge 120 may include four unit frames connected to each other at both ends thereof. The unit frames of the cartridge 120 may be separately manufactured and then assembled together, or may be manufactured in one piece from the beginning.

In particular, the secondary cells 110 may be pouch-type secondary cells having a substantially tetragonal shape. In the present embodiment, the main frames 121 may have a tetragonal ring shape as described above, and thus the secondary cells 110 may be placed in center empty spaces of the main frames 121 so as to surround edge portions of the secondary cells 110 from the outside. Therefore, the cartridges 120 may accommodate the secondary cells 110 and protect outer sides of the secondary cell 110.

In addition, each of the cartridges 120 may include a cooling plate 122 formed of a thermally conductive material and located in a center region thereof. For example, the cooling plate 122 of the cartridge 120 may be formed of aluminum and located in a center region of a tetragonal ring defined by the main frame 121. In this case, each of the cartridges 120 may include two cooling plates 122, that is, an upper plate and a lower plate that are spaced a predetermined distance from each other in a vertical direction. A flow path P may be formed between the two cooling plates 122 to allow a coolant such as air to flow along the flow path P. In the this cartridge structure, a secondary cell 110 may be placed on an upper side of the upper plate, and another secondary cell 110 may be placed on a lower side of the lower plate. In this case, it may be considered that one cartridge 120 accommodates two secondary cells 110. Heat generated from a secondary cell 110 may be transferred to an adjacent cooling plate 122 and dissipated to the outside by the coolant flowing along the flow path P between the cooling plates 122.

In addition, the cartridges 120 may be configured to be placed one on top of another. In particular, the plurality of cartridges 120 included in the battery pack may be stacked in a vertical direction as shown in FIG. 3. In this case, stacking surfaces of the cartridges 120, for example, upper and lower surfaces of the main frames 121, may have concave and convex structures corresponding to each other. In this case, owing to the concave and convex structures of the cartridges 120, the cartridges 120 may be more reliably coupled to and fixed to each other, and it may be easy to assemble the cartridges 120 because the concave and convex structures function as guides.

As described above, the cartridges 120 may accommodate pouch-type secondary cells 110 in inner spaces formed as the cartridges 120 are stacked, thereby limiting exposure of the secondary cells 110 to protect the secondary cells 110 from external physical or chemical agents, guiding arrangement of the secondary cells 110, and preventing relative movement of a stack of the secondary cells 110.

In addition, each of the cartridges 120 may include a coupling hole formed in at least one side thereof. For example, as indicated by H1 in FIG. 3, each of the cartridges 120 may include a coupling hole vertically formed through at least one of the four unit frames or in a corner at which two unit frames meet each other.

The lower housing 200 may have an empty inner space therein to accommodate the cell assembly 100. In addition, the lower housing 200 may have an opened upper side, and the cell assembly 100 may be inserted into the inner space through the opened upper side. That is, the lower housing 200 may have an inner space closed on bottom and lateral sides thereof and opened on an upper side thereof.

The lower housing 200 may include a plastic material. The plastic material is easy to shape, light in weight, and highly electrically insulative, thereby improving the productivity of the battery pack, reducing the weight of the battery pack, and guaranteeing insulation of the battery pack.

As shown in FIG. 2, the lower end plate 300 may have a plate shape, that is, a wide plate shape. In addition, the lower end plate 300 may include a metallic material having rigidity. For example, the lower end plate 300 may be a rectangular plate formed of steel.

In particular, in the battery pack of the present disclosure, the lower end plate 300 may be placed on a lower portion of the lower housing 200. That is, the lower end plate 300 may be placed on the lower portion of the lower housing 200 in a state in which the lower end plate 300 is laid in parallel to the ground, and an upper surface of the lower end plate 300 may be directly brought into contact with a lower surface of the lower housing 200.

The lower cover 400 may have a plate shape and placed on a lower portion of the lower end plate 300 to cover the lower end plate 300. For example, the lower cover 400 may have a larger area than a surface area of the lower end plate 300 such that a lower surface of the lower end plate 300 may not be exposed to the outside. In addition, like the lower housing 200, the lower cover 400 may include a plastic material.

In particular, the lower cover 400 may be coupled to the lower housing 200.

Figure 4:
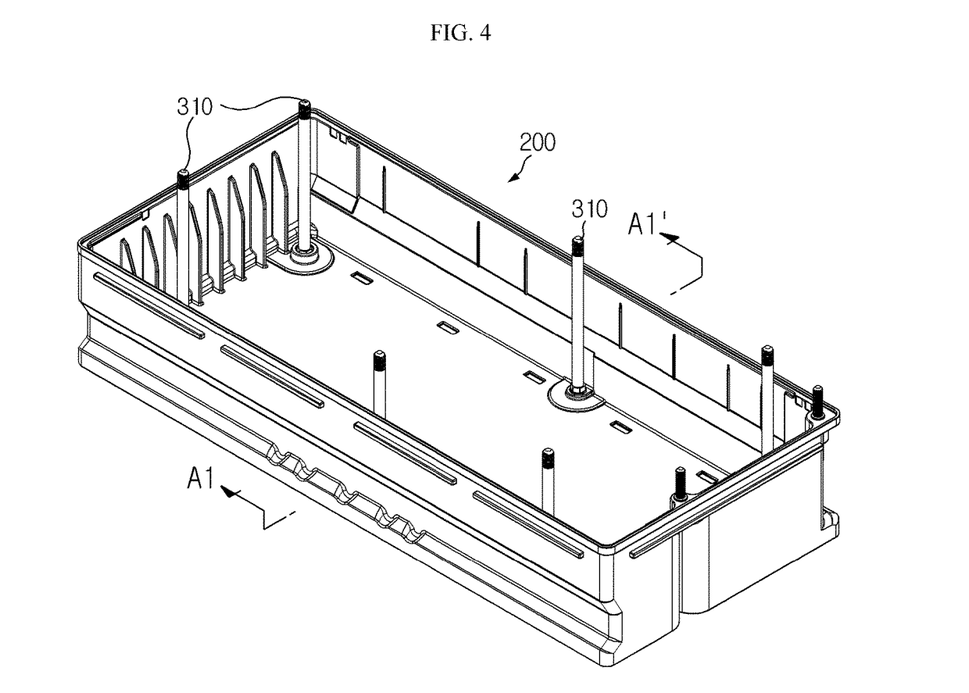
FIG. 4 is a perspective view schematically illustrating an assembly of a lower cover and a lower housing.

FIG. 4 is a perspective view schematically illustrating an assembly of the lower cover 400 and the lower housing 200. In addition, FIG. 5 is a cross-sectional view taken along line A1-A1' of FIG. 4, and FIG. 6 is a bottom view of the assembly shown in FIG. 4.

Figure 5:
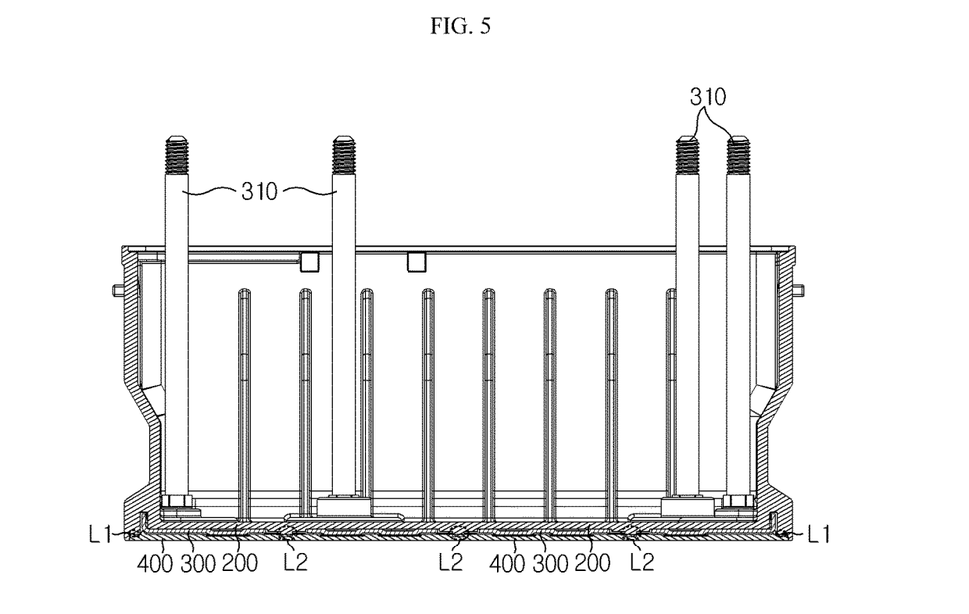
FIG. 5 is a cross-sectional view taken along line A1-A1' of FIG. 4.
Figure 6:
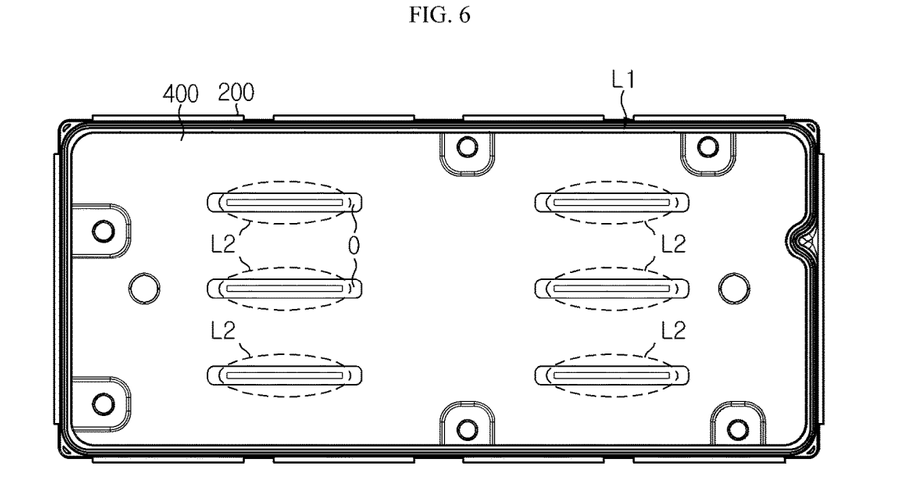
FIG. 6 is a bottom view of the assembly shown in FIG. 4.

Referring to FIGS. 4 to 6, at least a portion of the lower cover 400 may be coupled to the lower housing 200 to fix the lower cover 400 to the lower housing 200. In this case, the lower end plate 300 may be placed between the lower cover 400 and the lower housing 200. That is, the lower end plate 300 may be placed between the lower cover 400 and the lower housing 200 that are coupled to each other, and thus, on the whole, the lower end plate 300 may not be exposed to the outside. In this case, it may be considered that a pack case of the battery pack of the present disclosure includes the lower housing 200, the lower end plate 300, and the lower cover 400.

In particular, the lower cover 400 and the lower housing 200 may include a polymer material such as a plastic material, and the lower end plate 300 may include a metallic material.

In this case, it may be said that the pack case is configured by embedding a metal plate in a main body formed of a plastic material. According to this configuration of the present disclosure, the pack case is mainly formed of a polymer material, and thus characteristics such as electrical insulation, lightness, and formability may be guaranteed. In addition, since the rigidity of the pack case is improved owing to the metallic lower end plate 300 embedded in the pack case, the pack case may not be easily broken by an external impact or the like, and thus other components placed inside the battery pack may be protected. In addition, owing to the lower end plate 300 formed of a metallic material and embedded in the pack case, the sealability of the pack case may be improved, and thus moisture or foreign substances such as a nail-shaped part may not be introduced through the pack case.

Preferably, the lower cover 400 may be fixedly coupled to the lower housing 200 by a laser welding method. For example, the lower cover 400 may be fused to the lower housing 200 by irradiating contact portions of the lower cover 400 and the lower housing 200 with a laser beam. In this case, the lower cover 400 may transmit a laser beam, and the lower housing 200 may absorb the laser beam.

In the case of laser welding, the intensity of welding is controllable, and fine area welding is possible by focusing a laser beam on a very small area and transferring energy to the very small area. In addition, thermal deformation or property deterioration of workpieces, that is, the lower cover 400 and the lower housing 200 may occur to a small extent. According to the present disclosure, the lower cover 400 and the lower housing 200 of the battery pack may be coupled to each other by various laser welding methods known at the time of filing the present application such as a $CO_2$ laser welding method or a YAG laser welding method.

In particular, the lower cover 400 and the lower housing 200 may include the same plastic material. According to this aspect of the present disclosure, the lower housing 200 and the lower cover 400 may be laser-welded to each other with improved weldability, and thus the coupling strength between the lower housing 200 and the lower cover 400 may be stably maintained.

As described above, the lower cover 400 may be directly brought into contact with the lower housing 200 and fixedly coupled to the lower housing 200 by a laser welding method or the like.

In particular, the lower cover 400 may be fixedly coupled to the lower housing 200 along and outside an edge of the lower end plate 300. For example, the lower cover 400 may be welded to the lower housing 200 by irradiating outer circumferential portions indicated by L1 in FIGS. 5 and 6 with a laser beam. In this case, the shape of the portions welded with a laser beam may have an approximately rectangular shape.

Since the lower end plate 300 is placed between the lower cover 400 and the lower housing 200, the lower cover 400 and the lower housing 200 may be directly coupled to each other through portions on which the lower end plate 300 is not placed. That is, the lower cover 400 may be directly brought into contact with the lower housing 200 and welded to the lower housing 200 along and outside the edge of the lower end plate 300 as indicated by L1 in FIG. 5. To easily achieve this structure, the lower cover 400 may have a horizontal surface area similar to a lower surface area of the lower housing 200 but larger than the lower end plate 300. That is, the lower end plate 300 may have a horizontal surface area slightly smaller than those of the lower housing 200 and the lower cover 400. Then, owing to this size difference, an outer circumferential portion of the lower cover 400 may be coupled to the lower housing 200.

In addition to the outer circumferential portion of the lower cover 400, another portion of the lower cover 400 may be fixedly coupled to the lower housing 200. For example, the lower cover 400 may be directly welded to the lower housing 200 by irradiating center portions indicated by L2 in FIGS. 5 and 6 with a laser beam.

In this configuration of the present disclosure, since the lower cover 400 is coupled to the lower housing 200 in a center region by a method such as a laser welding method, the coupling strength between the lower cover 400 and the lower housing 200 may be stably maintained. In particular, according to this configuration of the present disclosure, the center region of the lower cover 400 may not be separated away from the lower end plate 300 or the lower housing 200.

In particular, the lower cover 400 and the lower housing 200 may have a rectangular shape when viewed from below. In this case, the lower cover 400 may be welded to the lower housing 200 in zones shaped like rods extending in parallel to long sides of the lower cover 400. Two or more such rod-shaped weld zones may be spaced apart from each other by a predetermined distance in a short-side direction of the lower cover 400 and a predetermined distance in a long-side direction of the lower cover 400.

According to this configuration of the present disclosure, a laser welding process may be easily performed, and fixing strength by the laser welding process may be stably maintained.

According to this configuration, center portions of the lower cover 400 and the lower housing 200 are directly brought into contact with and coupled to each other, and thus the lower end plate 300 placed between the lower cover 400 and the lower housing 200 may have openings at positions corresponding to the coupling portions. For example, as indicated by O in FIG. 2 and FIG. 6, a plurality of openings may be vertically formed through center portions of the lower end plate 300. In addition, the lower cover 400 may be directly brought into contact with the lower housing 200 through the openings O of the lower end plate 300 and may be coupled to the lower housing 200 by a method such as a welding method.

In the above embodiment, the case of coupling the lower cover 400 and the lower housing 200 to each other by a laser welding method is mainly described. However, this coupling method is not a limiting example. That is, the lower cover 400 and the lower housing 200 may be fixedly coupled to each other by a method other than a laser welding method. For example, the lower cover 400 and the lower housing 200 may be formed by an insert injection molding method. That is, injection molding may be performed by inserting the metallic lower end plate 300 into a polymer material for forming the lower cover 400 and the lower housing 200, and thus a structure in which the lower cover 400 and the lower housing 200 surround the lower end plate 300 may be obtained. In another example, the lower cover 400 may be formed by an over-molding method. That is, in a state in which the lower end plate 300 is mounted on the lower portion of the lower housing 200, the lower cover 400 may be molded on the lower portion of the lower end plate 300, and thus the lower end plate 300 may be placed between the lower housing 200 and the lower cover 400.

In addition, preferably, the lower housing 200 and the lower cover 400 may have concave and convex portions corresponding to each other.

For example, as indicated by L1 in FIG. 5, the lower housing 200 may include a concave portion recessed in an upward direction, and the lower cover 400 may include a convex portion protruding in the upward direction. In this case, the convex portion of the lower cover 400 may be formed in a ring shape along the outer circumferential portion of the lower cover 400. In addition, as indicated by L2 in FIG. 5, the lower housing 200 may include convex portions protruding in a downward direction, and the lower cover 400 may include concave portions recessed in the downward direction. In this case, the positions and shapes of the convex and concave portions may correspond to each other. When the lower cover 400 is placed below the lower housing 200 and the lower end plate 300, the convex portions may be inserted into the concave portions corresponding thereto.

According to this configuration of the present disclosure, the coupling position of the lower cover 400 may be easily determined with respect to the lower housing 200, and thus the lower housing 200 and the lower cover 400 may be easily assembled. In addition, the concave and convex portions may reduce horizontal relative movement of the lower housing 200 and the lower cover 400 during a coupling process such as a welding process, and thus the lower housing 200 and the lower cover 400 may be easily coupled to each other with high reliability, thereby guaranteeing stable coupling strength.

In addition, such concave and convex portions may be formed between the lower housing 200 and the lower end plate 300 and/or between the lower cover 400 and the lower end plate 300. For example, protrusions may protrude downward from the lower surface of the lower end plate 300, and downwardly-recessed concave portions may be formed in an upper surface of the lower cover 400 such that the protrusions may be inserted into the concave portions. In addition, protrusions may protrude upward from the upper surface of the lower end plate 300, and upwardly-recessed concave portions corresponding to the protrusions may be formed in the lower surface of the lower housing 200.

In this case, the lower end plate 300 may be easily assembled together with the lower housing 200 or the lower cover 400.

In addition, preferably, the lower end plate 300 may include at least one bolt 310 protruding upward.

For example, referring to FIG. 2, the lower end plate 300 may include a plurality of long bolts 310 extending upward, and lower ends of the long bolts 310 may be fixedly coupled to a plate-shaped main body of the lower end plate 300. For example, the lower ends of the long bolts 310 may be fixedly coupled to the main body of the lower end plate 300 using nuts.

In this configuration, the lower housing 200 may include at least one through-hole to receive the at least one bolt 310.

For example, referring to FIG. 2, the lower housing 200 may includes a plurality of through-holes H2 in positions and shapes corresponding to the long bolts 310. Therefore, when the lower end plate 300 is placed on the lower portion of the lower housing 200, the long bolts 310 of the lower end plate 300 may be placed in the inner space of the lower housing 200 through the through-holes H2.

In addition, the bolts 310 of the lower end plate 300 placed in the inner space of the lower housing 200 may penetrate portions of the cell assembly 100 as shown in FIG. 1. That is, as indicated by H1 in FIG. 2, one or more insertion holes may be vertically formed through the cell assembly 100, and the bolts 310 of the lower end plate 300 may be inserted into the insertion holes H1 of the cell assembly 100.

In this case, the insertion holes H1 of the cell assembly 100 may be formed in each of the cartridges 120. For example, when the cell assembly 100 includes a plurality of cartridges 120 accommodating secondary cells 110 and stacked in a vertical direction, the insertion holes H1 may be vertically formed through outer circumferential portions of the cartridges 120 as shown in FIG. 3. In addition, when the cartridges 120 are stacked, the insertion holes H1 may be connected to each other, and the bolts 310 of the lower end plate 300 may be inserted into the connected insertion holes H1.

Thus, according to this configuration of the present disclosure, relative movement of the cartridges 120 is prevented in the inner space of the lower housing 200, and thus relative movement of the secondary cells 110 accommodated in the inner spaces of the cartridges 120 may also be prevented. In addition, when the plurality of cartridges 120 are stacked in the inner space of the lower housing 200, since the bolts 310 of the lower end plate 300 are inserted into the insertion holes H1 of the cartridges 120, the stacking of the cartridges 120 may be guided.

In addition, according to this configuration of the present disclosure, the lower end plate 300 including the bolts 310 is placed at and fixed to the lower portion of the lower housing 200, and the bolts 310 are placed in the inner space of the lower housing 200 through the through-holes H2. Thus, the positions of the bolts 310 may not be varied while the battery pack is used. Therefore, even when the battery pack is impacted or vibrated, the positions of the bolts 310 may not be varied, and thus the cell assembly 100 may not be relatively moved.

In addition, according to this configuration of the present disclosure, a process of forming the cell assembly 100 and a process of accommodating the cell assembly 100 in the lower housing 200 may be performed at the same time, instead of stacking the plurality of cartridges 120 and the plurality of secondary cells 110 to form the cell assembly 100 and then fixedly accommodating the cell assembly 100 in the lower housing 200. Therefore, according to this aspect of the present disclosure, the battery pack may be manufactured in a short time with high processability.

In particular, in the battery pack of the present disclosure, the cell assembly 100 may be constructed by vertically stacking the secondary cells 110 and the cartridges 120, and the lowermost cartridge 120 of the cell assembly 100 may be placed on a bottom surface of the lower housing 200 in the inner space of the lower housing 200.

That is, in the battery pack of the present disclosure, the lower end plate 300 complementing the rigidity of the cell assembly 100 is provided in the pack case. Therefore, it is not necessary to place an additional metallic end plate on a lower portion of the cell assembly 100. Therefore, in the battery pack of the present disclosure, not an end plate but a cartridge 120 may be located on the lower portion of the cell assembly 100, and the cartridge 120 may be placed on the lower surface of the lower housing 200 in the inner space of the lower housing 200.

Therefore, according to this aspect of the present disclosure, since the lower housing 200, which may include a plastic material, is placed between the cell assembly 100 and the lower end plate 300, electrical insulation between the cell assembly 100 and the lower end plate 300 may be ensured. In addition, the lower end plate 300 may complement the rigidity of the pack case and the rigidity of the cell assembly 100 as well.

Figure 7:
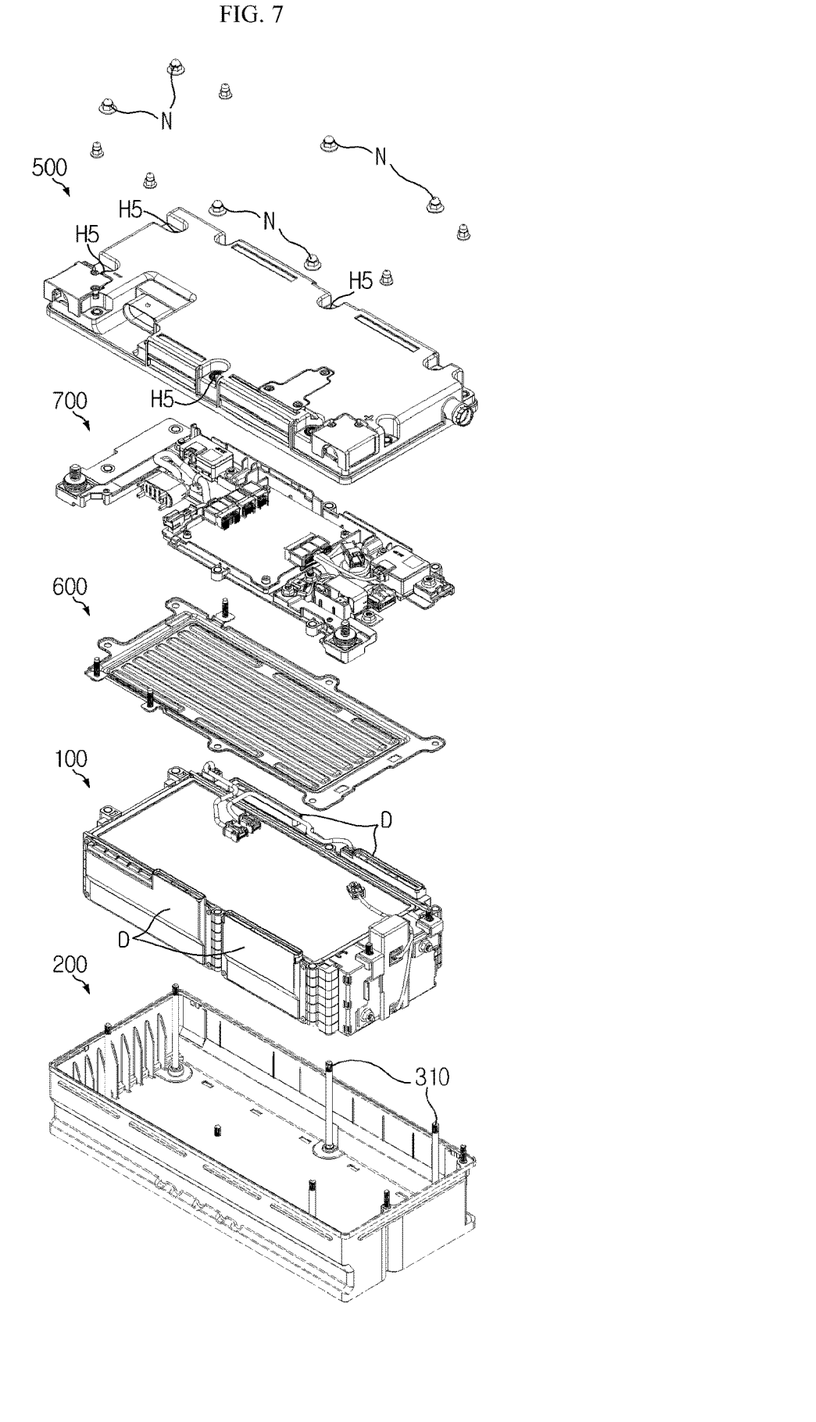
FIG. 7 is an exploded perspective view schematically illustrating a configuration of a battery pack according to an embodiment of the present disclosure.
Figure 8:
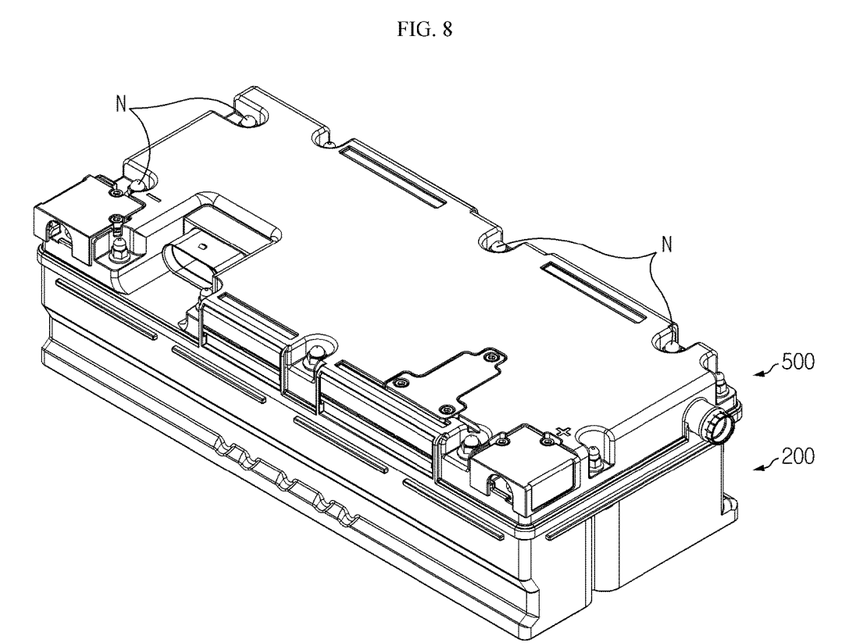
FIG. 8 is an assembled perspective view illustrating the battery pack shown in FIG. 7.

FIG. 7 is an exploded perspective view schematically illustrating a configuration of a battery pack according to an embodiment of the present disclosure, and FIG. 8 is an assembled perspective view illustrating the battery pack shown in FIG. 7.

Referring to FIG. 7, the battery pack of the embodiment of the present disclosure may further include an upper end plate 600.

The upper end plate 600 may include a plate-shaped metallic material and may be provided on an upper portion of a cell assembly 100. The upper end plate 600 may cover the upper portion of the cell assembly 100 to fix the cell assembly 100 in the upper portion of the cell assembly 100, complement the rigidity of the cell assembly 100, and maintain surface pressure acting on the upper portion of the cell assembly 100. In addition, the upper end plate 600 may protect the cell assembly 100 from external impacts.

Furthermore, bolts 310 of a lower end plate 300 may penetrate the upper end plate 600. That is, the bolts 310 of the lower end plate 300 may be inserted through coupling holes H1 of cartridges 120 and the upper end plate 600 as well.

In this case, the upper end plate 600 may be fixed using the bolts 310 of the lower end plate 300. Therefore, according to this configuration of the present disclosure, fastening parts or spaces for fixing the upper end plate 600 to the lower housing 200 or the cell assembly 100 may be reduced in number or may not be used. Therefore, manufacturing processes may be simplified, manufacturing costs and times may be reduced, and the inner space of the battery pack may be more efficiently used.

In addition, preferably, the battery pack of the embodiment of the present disclosure may further include an electric-component plate 700 as shown in FIG. 7.

The electric-component plate 700 has a plate shape, and at least one electric component such as a BMS, a current sensor, a relay, and a fuse may be mounted on the electric-component plate 700. The electric-component plate 700 may be electrically connected to secondary cells 110 of the cell assembly 100.

Here, the BMS refers to a battery management system configured to control charging and discharging operation steps of the battery pack. In general, such a BMS is included in a battery pack. The current sensor is a component configured to sense charge and discharge currents of the battery pack. The relay is a switching device configured to selectively open and close a charge/discharge path through which charge and discharge currents of the battery pack flow. In addition, the fuse is provided along the charge/discharge path of the battery pack, and if an abnormal situation occurs, the fuse melts and blocks charge/discharge current of the battery pack. The current sensor, the relay, and the fuse may exchange information with the BMS, and may be controlled by the BMS.

The electric-component plate 700 may be provided above the cell assembly 100. In addition, in an embodiment in which the upper end plate 600 is provided above the cell assembly 100, the electric-component plate 700 may be placed above the upper end plate 600. According to this configuration of the present disclosure, electric components may be easily mounted, assembled, and replaced.

In addition, the bolts 310 of the lower end plate 300 may penetrate the electric-component plate 700. That is, the bolts 310 of the lower end plate 300 may penetrate the coupling holes H1 of the cartridges 120, the upper end plate 600, and the electric-component plate 700 as well.

According to this configuration of the present disclosure, fastening parts or spaces for fixing the electric-component plate 700 inside a pack case may be decreased in number or may not be used. Therefore, in this case, manufacturing processes may be simplified, manufacturing costs and times may be reduced, and the inner space of the battery pack may be more efficiently used.

In addition, the battery pack of the present disclosure may further include a duct D for allowing a coolant such as air to flow into and out of the cell assembly 100. In particular, the duct D may include an inlet duct for introducing the coolant into the cell assembly 100, and an outlet duct for discharging the coolant from the cell assembly 100. The inlet duct and the outlet duct may be located at opposite sides for smooth flow of the coolant.

Furthermore, the coolant introduced through the inlet duct may flow between the secondary cells 110. In particular, each of the cartridges 120 may include two cooling plates 122 spaced a predetermined distance from each other, and the coolant may be introduced through gaps between the cooling plates 122. The coolant flowing through the gaps between the cooling plates 122 of the cartridges 120 may be discharged to the outside through the outlet duct.

In addition, preferably, as shown in FIGS. 7 and 8, the battery pack of the present disclosure may further include an upper housing 500.

The upper housing 500 may be coupled to an opened upper side of the lower housing 200 to seal the opened upper side. The upper housing 500 may include a plastic material to guarantee electrical insulation, lightness, and formability.

In particular, the upper housing 500 may be fastened and fixed to the lower housing 200 using the bolts 310 of the lower end plate 300. That is, the upper housing 500 may include coupling holes H5 at positions corresponding to the bolts 310 of the lower end plate 300, and the bolts 310 of the lower end plate 300 may be inserted through the coupling holes H5 and protrude from an upper portion of the upper housing 500. In addition, fastening members such as nuts may be coupled to protruding upper ends of the bolts 310, so as to fasten and fix the upper housing 500 to the bolts 310. The bolts 310 are mounted on the lower end plate 300 which is fixed to a lower portion of the lower housing 200, and thus the upper housing 500 fastened and fixed to the bolts 310 may be regarded as being fastened and fixed to the lower housing 200.

According to this configuration of the present disclosure, since the lower housing 200 and the upper housing 500 are fixedly coupled to each other using the bolts 310 of the lower end plate 300, additional fastening members are not required to fasten the lower housing 200 and the upper housing 500 to each other. Therefore, according to this aspect of the present disclosure, the processability and productivity of the battery pack may be improved, and the structure of the battery pack may be simplified. Furthermore, according to the present disclosure, the lower end plate 300 is placed below the lower housing 200, and the upper housing 500 is coupled to the bolts 310 of the lower end plate 300. Thus, the coupling strength between the lower housing 200 and the upper housing 500 may be high.

In addition, a sealing member may be included between the upper housing 500 and the lower housing 200. For example, a sealing member formed of rubber or silicone may be provided in a ring shape along contact edge portions of the upper housing 500 and the lower housing 200. According to this configuration of the present disclosure, sealing between the upper housing 500 and the lower housing 200 may be improved owing to the sealing member, thereby preventing permeation of moisture or foreign substances such as dust between the upper housing 500 and the lower housing 200. In addition, according to this configuration of the present disclosure, even when gas is generated from the secondary cells 110, it is possible to discharge the gas along an intended path, thereby preventing the gas from leaking through an unexpected path and users from breathing in the gas.

The battery pack of the present disclosure may further include other elements in addition to the above-described elements. For example, the battery pack of the present disclosure may further include a bus bar for transmitting charge or discharge power to or from the cell assembly 100, a cable for transmitting electric signals, and a power terminal for connection to an external charge/discharge device.

The battery pack of the present disclosure may be applied to automobiles such as electric or hybrid vehicles. That is, according to the present disclosure, an automobile may include the battery pack according to the present disclosure. In particular, a vehicle such as an electric vehicle obtaining driving power from a battery may include a middle to large-sized battery pack, and in this case, factors such as ensuring the rigidity and coupling strength of the battery pack, improving the energy density of the battery pack, and reducing the weight and size of the battery pack may be important. Therefore, when the battery pack of the present disclosure is applied to such a vehicle, these factors may be improved.

Figure 9:
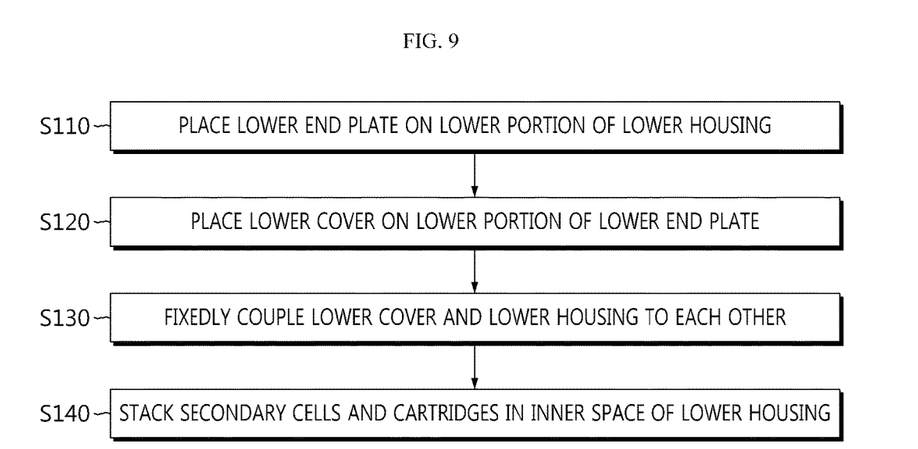
FIG. 9 is a flowchart schematically illustrating a method of manufacturing a battery pack according to an embodiment of the present disclosure.

FIG. 9 is a flowchart schematically illustrating a method of manufacturing a battery pack according to an embodiment of the present disclosure.

Referring to FIG. 9, according to the embodiment of the present disclosure, the method of manufacturing a battery pack includes: placing a lower end plate 300 on a lower portion of a lower housing 200 (S110); placing a lower cover 400 on a lower portion of the lower end plate 300 (S120); fixedly coupling the lower cover 400 and the lower housing 200 to each other (S130); and stacking secondary cells 110 and cartridges 120 in an inner space of the lower housing 200 (S140).

In operation step S110, the lower end plate 300, which is formed of a plate-shaped metallic material, may be brought into surface contact with the lower portion of the lower housing 200 having an empty inner space and an opened upper side.

In operation step S120, the lower cover 400 may be placed on the lower portion of the lower end plate 300 to cover the lower end plate 300. In operation step S130, at least a side of the lower cover 400 and at least a side of the lower housing 200 may be fixedly coupled to each other.

In operation step S140, the secondary cells 110 and the cartridges 120 accommodating the secondary cells 110 while surrounding outer circumferential portions of the secondary cells 110 from the outsides of the secondary cells 110 may be stacked in the inner space of the lower housing 200.

In operation step S130, preferably, a laser welding method may be used.

In addition, preferably, the lower end plate 300 may include at least one bolt 310 protruding upward, and the lower housing 200 may include at least one through-hole H2. Therefore, in operation step S110, the bolt 310 of the lower end plate 300 may be inserted through the through-hole H2 of the lower housing 200.

In addition, preferably, each of the cartridges 120 may include at least one insertion holes H1. Thus, in operation step S140, the bolt 310 of the lower end plate 300 may be inserted through the insertion holes H1 of the cartridges 120.

Furthermore, after operation step S140, the method may further include an operation step of placing an upper end plate 600, which is formed of a plate-shaped metallic material, on an upper portion of the cell assembly 100. In this case, the bolt 310 of the lower end plate 300 may be inserted through the upper end plate 600.

In addition, after operation step S140, the method may further include an operation step of placing an electric-component plate 700, on which at least one of a BMS, a current sensor, a relay, and a fuse is mounted, on the upper portion of the cell assembly 100. In this case, the bolt 310 of the lower end plate 300 may be inserted through the electric-component plate 700. In addition, if the battery pack includes the upper end plate 600, the electric-component plate 700 may be placed on an upper end of the upper end plate 600.

In addition, after the operation step S140, the method may further include an operation step of coupling an upper housing 500 to the opened upper side of the lower housing 200 in a state in which the bolt 310 of the lower end plate 300 is inserted through the upper housing 500 and an operation step of coupling a fastening member such as a nut to the bolt 310 of the lower end plate 300 protruding upward from the upper housing 500.

While embodiments of the present disclosure has been described with reference to the accompanying drawings, it should be understood that the embodiments are given by way of illustration only, and various changes and modifications within the scope of the disclosure as defined by the appended claims will become apparent to those skilled in the art.

In the present disclosure, terms indicating directions such as upward and downward are used to express relative positions. These terms are for ease of description, and it will be apparent to those skilled in the art that these terms may vary depending on the position of an object or an observer.

What is claimed is:

1. A battery pack comprising:
   a cell assembly comprising a plurality of secondary cells and a plurality of cartridges, the cartridges being configured to be stacked on one another and to accommodate the secondary cells while surrounding outer circumferential portions of the secondary cells from outsides of the secondary cells;
   a lower housing having a bottom wall and a sidewall extending upwardly from the bottom wall to define an empty inner space to accommodate the cell assembly in the inner space, the lower housing being opened on an upper side thereof;
   a lower end plate comprising a plate-shaped metallic material and placed in surface contact with a lower surface of the bottom wall of the lower housing; and
   a lower cover placed on a lower surface of the lower end plate to cover the lower end plate, the lower cover being fixedly coupled to the lower housing and the lower end plate being between the lower housing and lower cover.

2. The battery pack of claim 1, wherein the lower cover is fixedly coupled to the lower housing by a laser welding method.

3. The battery pack of claim 2, wherein the lower cover and the lower housing comprise a same plastic material.

4. The battery pack of claim 1, wherein the lower cover is fixedly coupled to the lower housing along and outside an edge of the lower end plate.

5. The battery pack of claim 1, wherein at least one opening is formed in a center portion of the lower end plate, and
   wherein the lower cover is fixedly coupled to the lower housing through the opening.

6. The battery pack of claim 1, wherein the lower housing and the lower cover comprise concave and convex portions corresponding to each other.

7. A battery pack comprising:
   a cell assembly comprising a plurality of secondary cells and a plurality of cartridges, the cartridges being configured to be stacked on one another and to accommodate the secondary cells while surrounding outer circumferential portions of the secondary cells from outsides of the secondary cells;
   a lower housing having an empty inner space to accommodate the cell assembly in the inner space, the lower housing being opened on an upper side thereof;
   a lower end plate comprising a plate-shaped metallic material and placed in surface contact with a lower surface of the lower housing; and
   a lower cover placed on a lower portion of the lower end plate to cover the lower end plate, the lower cover being fixedly coupled to the lower housing,
   wherein the lower end plate comprises at least one bolt protruding upward, and
   wherein at least one through-hole is formed in the lower housing to pass the bolt through the through-hole.

8. The battery pack of claim 7, wherein at least one insertion hole is formed in the cell assembly, and
   wherein the bolt is inserted in the insertion hole.

9. The battery pack of claim 1, wherein the secondary cells and the cartridges of the cell assembly are vertically stacked, and
   a lowermost cartridge of the cell assembly is placed in the inner space of the lower housing in contact with a an upper surface of the bottom wall of the lower housing.

10. The battery pack of claim 1, further comprising an upper end plate comprising a plate-shaped metallic material and provided on an upper portion of the cell assembly to cover the upper portion of the cell assembly.

11. The battery pack of claim 1, further comprising an upper housing coupled to the opened upper side of the lower housing to seal the opened upper side.

12. An automobile comprising the battery pack of claim 1.

13. A method of manufacturing a battery pack, the method comprising:
   placing a lower end plate comprising a plate-shaped metallic material on a lower surface of a bottom wall of a lower housing comprising a sidewall extending upwardly from the bottom wall to define an empty inner space and an opened upper side such that the lower end plate makes surface contact with the lower surface of the bottom wall of the lower housing;
   placing a lower cover on a lower surface of the lower end plate to cover the lower end plate;

fixedly coupling the lower cover and the lower housing to each other so that the lower end plate is between the lower cover and the lower housing; and stacking secondary cells and cartridges in the inner space of the lower housing, the cartridges accommodating the secondary cells while surrounding outer circumferential portions of the secondary cells from outsides of the secondary cells.

14. The method of claim 13, wherein, in the fixedly coupling of the lower cover and the lower housing to each other, the lower cover and the lower housing are fixedly coupled to each other by a laser welding method.

15. The method of claim 13, wherein the lower end plate comprises at least one bolt protruding upward, and the lower housing comprises at least one through-hole, and in the placing of the lower end plate, the bolt of the lower end plate is passed through the through-hole of the lower housing.

16. The method of claim 15, wherein at least one insertion hole is formed in each of the cartridges, and in the stacking of the secondary cells and the cartridges, the bolt of the lower end plate is inserted into the insertion holes of the cartridges.

17. The battery pack of claim 1, wherein the lower surface of the bottom wall of the lower housing has a concave portion, and wherein a convex portion of the lower end plate extends into the concave portion.

18. The method of claim 13, further comprising inserting a convex portion of the lower end plate into a concave portion in the lower surface of the bottom wall of the lower housing.

* * * * *